United States Patent
Zippel et al.

[15] 3,677,681
[45] July 18, 1972

[54] MOULD FILLING APPARATUS

[72] Inventors: Bernd Zippel, Langenhain; Alfred Schlieckmann, Eschwege, both of Germany

[73] Assignee: Richard Zippel & Co., KG., Eschwege, Germany

[22] Filed: Feb. 20, 1970

[21] Appl. No.: 13,079

[30] Foreign Application Priority Data

March 29, 1969 Germany .................... P 19 16 330.5

[52] U.S. Cl. ................... 425/145, 264/40, 264/45, 264/54, 425/375, 425/242, 425/817
[51] Int. Cl. ................................................. B29f 1/04
[58] Field of Search ........... 18/30 CM, 30 CU, 30 CK, 30 JA, 18/5 P, 5 A, 2 HA, 1 E; 264/40, 45, 54; 266/23 B, 23 E, 23 D; 164/154, 155; 250/202; 33/18; 72/7; 118/211, 323; 107/8 H, 27 R, 27 A, 27 B

[56] References Cited

UNITED STATES PATENTS

| | | | |
|---|---|---|---|
| 3,535,382 | 8/1970 | Devol | 18/2 HA X |
| 2,331,337 | 10/1943 | Meyer | 266/23 B X |
| 3,532,893 | 10/1970 | Marantette et al. | 250/202 X |
| 3,247,816 | 4/1966 | Polevitzky | 250/226 X |
| 1,981,117 | 11/1934 | Oakley | 266/23 E X |
| 2,314,327 | 3/1943 | Drake | 266/23 E |
| 2,827,665 | 3/1958 | Rogers, Jr. et al. | 18/4 C |

Primary Examiner—J. Spencer Overholser
Assistant Examiner—David S. Safran
Attorney—Nolte and Nolte

[57] ABSTRACT

Mould filling apparatus is disclosed. The apparatus comprises a nozzle for injection mould filling material, means for mounting a mould to be filled under the nozzle, displacement means for displacing the nozzle relative to the mould to be filled during a filling operation in accordance with a predetermined program dependent on the geometry of the mould to be filled. The pre-determined program for each mould to be filled is represented by a mechanical or optical pattern, which is sensed by sensing means associated with the nozzle. The sensing means is arranged to control the displacement means to cause the nozzle to follow, for example, a meandering path corresponding to the pattern sensed.

4 Claims, 8 Drawing Figures

INVENTORS
BERND ZIPPEL
ALFRED SCHLIECKMANN
BY Nolte & Nolte
ATTORNEYS

INVENTORS
BERND ZIPPEL
ALFRED SCHLIECKMANN
BY Nolte & Nolte
ATTORNEYS

MOULD FILLING APPARATUS

BACKGROUND OF THE INVENTION.

The present invention relates to improvements in mould filling apparatus, especially for the manufacture of large or complicatedly-shaped mouldings from fluid multi-component synthetic plastics.

Generally, mould filling plants comprise a fixed mould filling machine which is provided with a dispensing means, a mixing means and an injection nozzle for ejecting the mixed fluid synthetic plastic components into a succession of moulds. Such moulds are open during the filling process and are adapted to be inserted into the mould filling machine.

Such plants suffer from the disadvantage that, in the case of large or complicatedly shaped mouldings, the density of the foamed synthetic plastics in different portions of the moulded articles differs, so that the mechanical properties of such portions also differ.

In packing cases, for example, it often happens that the corners are very much softer than more central parts of the packing case, particularly if the interior of the packing case is shaped to match the item which is to be packed inside it. However, the corners of packing cases should be hard and be able to withstand mechanical shocks while the interior should be as soft as possible so as to afford as soft a seating as possible for the contents. In the manufacture of upholstered furniture from foamed synthetic plastics, similar difficulties often arise. In the manufacture of ornamentation for furniture intended to imitate, for example, baroque or rococo carvings, extremely soft places often arise in inappropriate parts of the moulding.

Undue softness in some portions of a moulding is due to insufficient material having flowed into these portions of the mould and too much material being located at other portions of the mould. It is very difficult to eliminate these irregularities, because the media utilized in foundry technology in order to avoid similar faults when casting metals, cannot be used in the case of foaming synthetic plastics, because herein, in the processing of fluid multi-component synthetic plastics, the mixed fluid synthetic plastic is poured into the open mould, after which the mould is closed, so that only the foaming pressure acting inside the closed mould can force the synthetic plastic into the outermost parts of the mould.

In the manufacture of complicated mouldings, it has been proposed that such mouldings be composed of a plurality of pieces in order to reduce irregularities in the hardness of the resulting composite moulded article.

SUMMARY OF THE INVENTION

According to the present invention there is provided mould filling apparatus comprising a nozzle for injecting mould filling material, means for mounting or carrying a mould to be filled, displacement means for displacing the nozzle relative to the mould to be filled during a filling operation in accordance with a pre-determined program dependent on the geometry of the mould to be filled.

It is expedient for the displacement of the nozzle to occur in two co-ordinates which lie in a plane parallel with the plane of division of the mould.

In consequence, the injector nozzle is guided in keeping with a pre-determined program so that it injects a lot of material at places which are to be particularly hard and less material at places which are to have a greater degree of softness. In particular, a skilful guiding of the injector nozzle can result in the material being evenly distributed in the interior of the mould.

One possibility is for the feed to occur step-by-step, by pulses. In accordance with a pre-determined program, then, the feed occurs by one step at a time forwardly, to the left or to the right or to the rear in any desired sequence of a plurality of steps. Such a stepwise feed does not, however, allow any excessively large number of steps, so that particularly complicated moulds cannot be filled by such a process.

More complicated moulds can be better filled with a plant in which the nozzle displacement proceeds continuously and at the same speed and in which the movement of the injector nozzle follows looped, zig-zag or undulating lines in the case of mould portions of larger mould cross-section or in the case of differing strength requirements. In this case, the injector nozzle can be made to move rapidly and so meet the requirement of multi-component synthetic plastics which require a complete injection of the entire mould contents within 30 seconds, or up to at most 2 minutes in the case of large moulds.

It is expedient for the injector nozzle to be mounted on a co-ordinate table which is moved in two co-ordinates or to be mounted on the end of an articulated arm. Either means results in rapid mobility.

The displacement of the injector nozzle may be controlled by means of a mechanical or optical pattern on a template or screen. In these circumstances, sensing means for sensing the pattern on the template or screen are provided. For example, sensing means which scans the edge of the pattern may be provided. Such sensing means may be known mechanical sensing devices such as are used, for example, on copy milling machines or on template controlled gas-cutting machines. However, the sensing means may be an optical sensing device, for example a photoelectric cell or a photo-resistance.

It is expedient for a separate pattern template to be associated with each mould because, in mould filling plants, all manner of moulds may be filled one after another in order to make the most economic possible use of the moulds on the one hand and the plant on the other.

Plate-like templates having an edge shaped according to the desired displacement of the injector nozzle, may not satisfy all the conditions which arise in complicated moulds.

It has been found that most of the conditions required to be fulfilled by even particularly complicated moulds can be satisfied by one template in the form of a ground glass plate with a pattern projected optically thereon from a suitable optical object. With such an optical arrangement, it is a simple matter to produce the most complicated patterns. The curve representing the requisite program of nozzle displacement is simply photographed and projected as a transparency onto the ground glass screen, for example. With this arrangement, it is also possible to rapidly modify the program. The injector nozzle can be guided with great accuracy using photoelectric sensing means.

An optical projection and sensing device for controlling the nozzle displacement in a mould filling plant is extremely versatile, since by adjusting the lenses employed to project the pattern, the size of the projected image may be varied. In this way, the same optical object may be employed for controlling the nozzle displacement for filling moulds of similar proportions but of different sizes.

The dimensions of a control curve or pattern representing the requisite pre-determined program of nozzle displacement are chosen according to the volume of the corresponding mould. If it should prove that the length of a portion of the control curve is insufficient then, by simply adding one loop from this portion of the control curve, the length can be extended, while simple omission of a loop can shorten the existing length of such a portion. Since these extensions and shortenings can be made on a drawing, which is then projected, adaptation of the control curve to the requirements of each individual mould is particularly simple with this type of optical pattern.

A further advantage of such an arrangement resides in the fact that the optical object and hence the optical image or pattern projected may consist of a plurality of differently colored portions and that the scanning arrangement, comprising photoelectric cells, may be arranged to emit different control signals according to the color of the portion scanned, in order to appropriately control the nozzle displacement. For example, it may be expedient to discontinue injection of the mould filling material at certain places in a particular mould. This can be achieved by selecting a different color for portions of the control curve which forms the pattern sensed. In other cases, it may be expedient for the control curves partly to intersect, so that some places in the mould are twice injected with fluid plastic material. In these cases, differentially colored portions of the image forming the pattern sensed may serve to guide the scanning means in the correct manner according to the particular coloring of the pattern provided.

BRIEF DESCRIPTION OF THE DRAWINGS.

Embodiments of the present invention will now be more particularly described with reference to the accompanying drawings, in which:

FIG. 4b shows a control curve for guiding the ejector nozzle during the filling of the mould shown in FIG. 4a;

FIG. 4c shows a perspective view of the armchair of FIG. 4a;

FIG. 5b shows a control curve for guiding the injector nozzle during the manufacture of the moulded packing case of FIG. 5a.

DESCRIPTION OF THE PREFERRED EMBODIMENTS.

Figure 1:
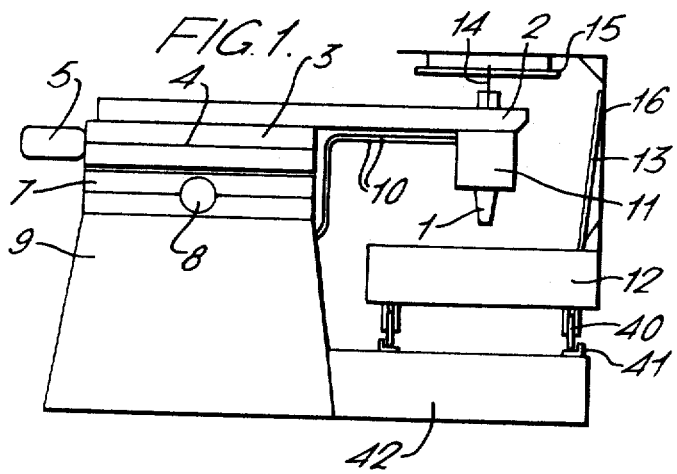
FIG. 1 shows mould filling apparatus embodying the invention and in which the nozzle displacement is controlled by means of a plate-like template.

Referring now to the drawings, the injector nozzle 1 of a plant for manufacturing mouldings from fluid multi-component synthetic plastics is mounted on an arm 2 which is mounted on a co-ordinates table. The co-ordinates table comprises a component table 3 driven by means of a helical shaft 4. The helical shaft 4 is driven by an electric motor 5 in one co-ordinate direction. Movement in the other co-ordinate direction is provided for by the provision of another component table 7, which is moved by means of an electric motor 8. Alternatively, the components of the co-ordinate table may be displaced by fluid operated displacement means. Pipes 10 lead to the injector nozzle 1 from a dispensing device 9 through a mould filling material mixing device 11, which contains the necessary valves for controlling the flow of the constituents of the synthetic plastics. The injector nozzle 1 is displaced over an open mould 12, the cover of which is indicated by the reference 13. Above the injector nozzle 1 is sensing means 14 which senses the edge of a plate-like template 15 disposed above the mould 12. This template is mounted on the mould 12 by means of a mounting bracket 16. Any suitable means may be employed for mounting or carrying a mould to be filled, in the embodiment illustrated in FIG. 1, the moulds are mounted on wheels 40 which engage rails 41 disposed on a platform 42 below the nozzle 1.

Figure 2:
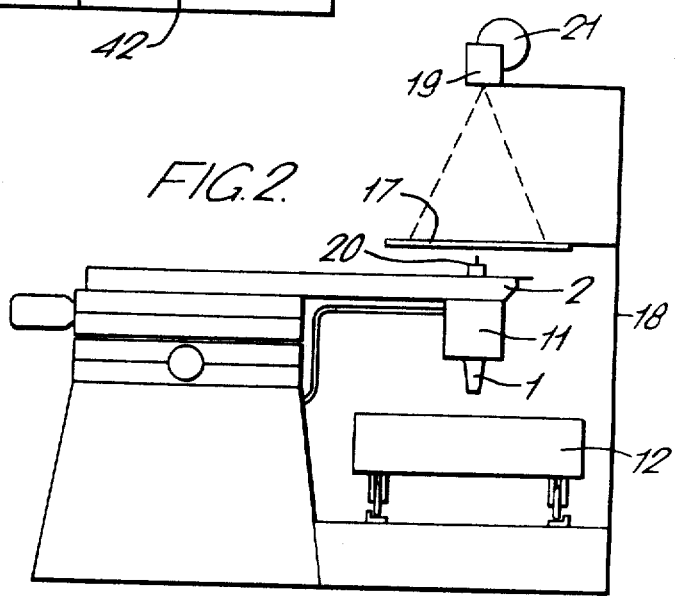
FIG. 2 shows mould filling apparatus comprising an optically controlled arrangement in which transparencies are accommodated in a magazine.

FIG. 2 shows an embodiment in which optical sensing means are employed to control displacement of the nozzle 1. In this case, a translucent ground glass screen 17 is secured by means of a bracket 18 on the dispensing means 9 (FIG.1) of the fixed mould filling machine. Disposed above the ground glass plate 17 is a transparency projector 19 for projecting control curves on to the ground glass screen 17. The projected control curves form an optical pattern which is scanned by an optical scanner 20 which, using per se known means, controls displacement of the component tables 3 and 7. With this type of control of the movement of the injector nozzle 1, the individual transparencies providing control curves corresponding to the respective moulds are stored in an appropriate sequence in a magazine 21 of the projector 19. It is expedient to use a transparency projector 19 for projection, wherein the transparencies are automatically changed by a pulse from the mould filling plant or in response to a pulse triggered by a mould 12 being introduced into the mould filling plant.

Figure 3:
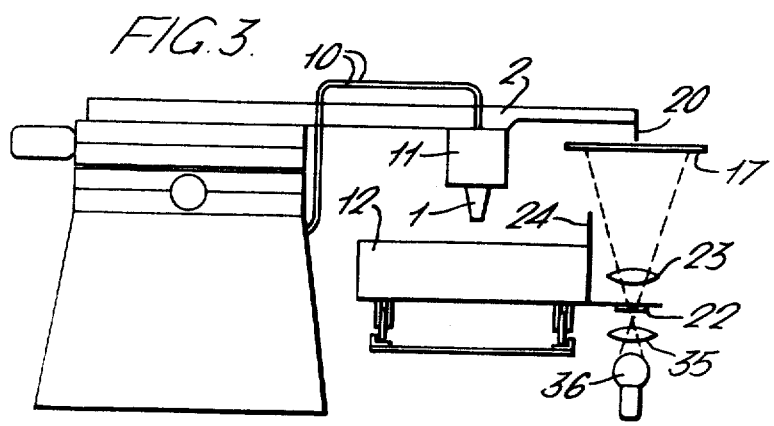
FIG. 3 shows mould filling apparatus comprising another optically controlled arrangement in which each mould carries a transparency adapted to control the injection of mould filling material into the respective mould.

As shown in FIG. 3, a transparency 22 is secured to the mould 12 and is projected by means of a light source 36 and lenses 23 and 35, on to the ground glass screen 17. As shown in FIG. 3, the screen 17 is disposed to one side of the mixing device 11 and the sensing means 20 is carried by an extension of the support arm 2. A wall 24 serves to protect the transparency 22. Each mould fed through the plant, such as the mould 12, carries a transparency providing a control curve forming a pattern appropriate to the respective mould to which the transparency is secured.

Figure 4A:
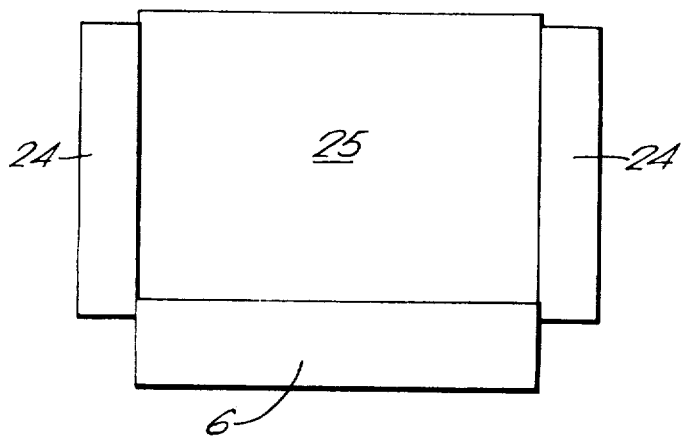
FIG. 4a shows a view of a mould for manufacture of a complete armchair.
Figure 4B:
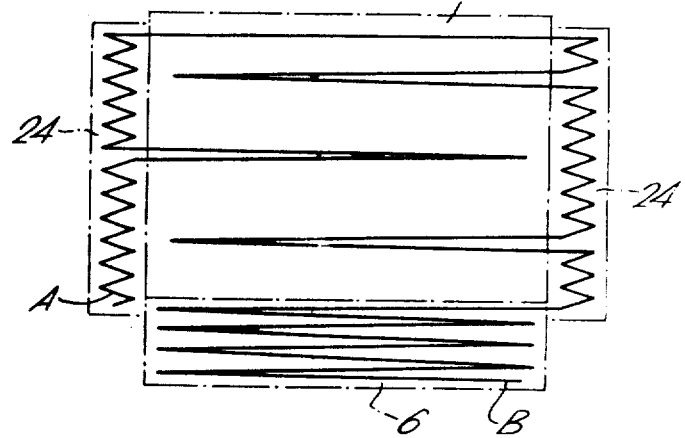
Figure 4C:
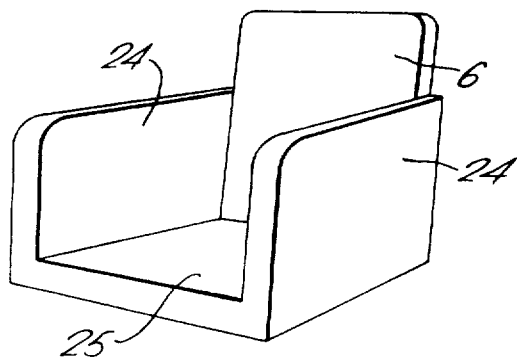

FIG. 4a is a plan view of an armchair mould with chairback 6, side members 24 and seat 25. While the seat 25 occupies a large area of little height, the side parts 24 and the back part 6 are of a considerable height. As FIG. 4b shows, therefore, the control curve beginning at A and ending at B describes a very meandering path in the region of the side parts 24 and back part 6, while only a few lines of the control curve are located on the seat part 25. In order to illustrate the position of the control curve, this latter is drawn in solid lines in FIG. 4b while the outlines of the armchair mould are shown in broken lines. FIG. 4c shows a perspective view of the moulded armchair produced by filling the mould shown in FIGS. 4a and 4b.

Figure 5A:
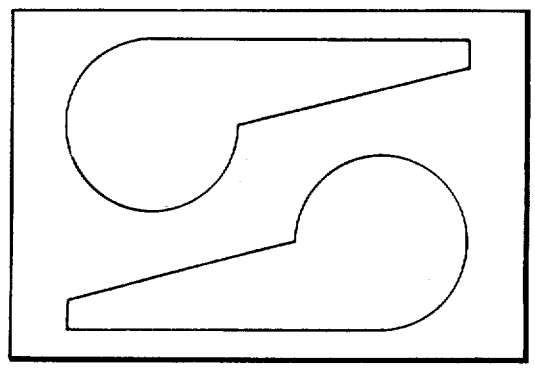
FIG. 5a shows a view of a moulded packing case for two glass retorts.
Figure 5B:
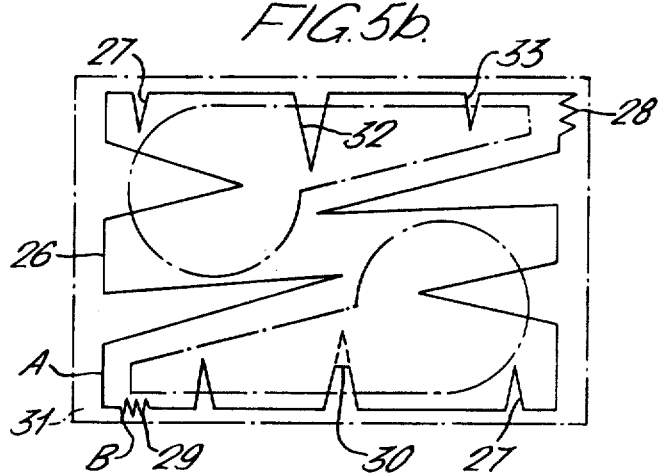

FIG. 5a shows a plan view of a packing case mould for two glass retorts. FIG. 5b shows the position of the control curve 26, which is indicated by solid lines, while the outlines of the packing case mould are shown by broken lines. Loops 27 and 28, and also 29, disposed at the corners of the mould serve to strengthen the moulded article in these regions. In these regions, a particularly large amount of mould filling material is injected since the injector nozzle 1 moves at a constant speed and delivers at a constant rate. At the location 30, a correction to the original form of the control curve has been carried out subsequently. Originally, it was intended that the control curve should extend along the dotted line at the location 30 but it became manifest that the mould corner 31 was not then being made sufficiently strong. For this reason, the transverse connecting line 30 was introduced which shortens the control curve at this location, so that the injector nozzle 1 can remain for a longer time at location B in FIG. 5b.

The loops 32 and 33 are provided at the location of the mould recesses adapted to take the retort necks. These loops 32 and 33 serve to ensure that sufficient material for the bottom of these recesses is ejected at these locations.

With an optical template, it is possible to produce extraordinarily complicated control curves with the simplest means and in the simplest manner. Complicated moulds for the copying of baroque and rococo carvings can in this manner be so filled that an even thickness of material, and hence, a uniform strength is achieved throughout. It is possible, by differently coloring portions of the optical objects providing the control curves, to generate control signals to interrupt the injection process in places where otherwise too much material would reach, and also at places at which no material at all is desired. With such optically projected control curves, it is possible to fill the most complicated moulds in the manner desired.

WE CLAIM:

1. Mould filling apparatus comprising in combination:
   a source of mould filling material;
   a nozzle to inject said material into a mould to be filled;
   mounting means to successively support respective ones of a plurality of moulds to be filled below said nozzle;
   displacement means to displace said nozzle in two co-planar co-ordinate directions across a mould supported on said mounting means during each mould filling operation;
   a plurality of transparencies each carrying a respective pattern, each transparency being attached to a respective one of the moulds to be filled;
   image forming means;

projection means to project an image of the respective pattern on to said image forming means when a respective one of said moulds to be filled is supported on said mounting means;

photosensitive sensing means associated with said nozzle;

said sensing means controlling said displacement means to cause said nozzle to follow the pattern on the transparency attached to the respective mould being filled during each mould filling operation and thereby traverse said mould.

2. Apparatus as defined in claim 1, wherein each said transparency comprises a plurality of differently colored portions, and said photosensitive sensing means is differentially responsive to said differently colored portions and generates further control signals to control said injection of said mould filling material in dependence upon the color of each of said differently colored portions.

3. Mould filling apparatus comprising in combination:

a source of mould filling material;

a nozzle to inject said material into a mould to be filled;

photosensitive sensing means associated with said nozzle;

mounting means to successively support respective ones of a plurality of moulds to be filled below said nozzle;

a source of control signals synchronized to provide a control signal on each of the moulds to be filled being placed on said mounting means;

displacement means to displace said nozzle in two co-planar co-ordinate directions across a mould supported on said mounting means during each mould filling operation;

a plurality of transparencies, each transparency carrying a pattern and corresponding to a respective one of the moulds to be filled;

a magazine to store said plurality of transparencies;

image forming means;

projecting means to project said transparencies one at a time on to said image forming means to form an image of the pattern carried by the projected transparency;

said magazine being responsive to each of said control signals to feed a respective one of said transparencies to said projecting means, and said sensing means controlling said displacement means to cause said nozzle to follow said imaged pattern during each mould filling operation and thereby traverse said mould.

4. Apparatus as defined in claim 3, wherein each said transparency comprises a plurality of differently colored portions, and said photosensitive sensing means is differentially responsive to said differently colored portions and generates a further control signals to control said injection of said mould filling material in dependence upon the color of each of said differently colored portions.

* * * * *